United States Patent
Langlois et al.

(10) Patent No.: US 9,144,744 B2
(45) Date of Patent: Sep. 29, 2015

(54) LOCATING AND ORIENTING DEVICE IN SPACE

(71) Applicant: Microsoft Corporation, Redmond, WA (US)

(72) Inventors: Eric Langlois, Bothell, WA (US); Ed Pinto, Woodinville, WA (US); Marcelo Lopez Ruiz, Redmond, WA (US); Todd Manion, Seattle, WA (US); Zsolt Mathe, Redmond, WA (US)

( * ) Notice: Subject to any disclaimer, the term of this patent is extended or adjusted under 35 U.S.C. 154(b) by 99 days.

(21) Appl. No.: 13/914,600

(22) Filed: Jun. 10, 2013

(65) Prior Publication Data

US 2014/0364227 A1 Dec. 11, 2014

(51) Int. Cl.
| | |
|---|---|
| *A63F 9/24* | (2006.01) |
| *A63F 13/00* | (2014.01) |
| *G06F 17/00* | (2006.01) |
| *G06F 19/00* | (2011.01) |
| *A63F 13/56* | (2014.01) |
| *A63F 13/28* | (2014.01) |
| *A63F 13/20* | (2014.01) |
| *A63F 13/52* | (2014.01) |
| *G06F 1/16* | (2006.01) |
| *G06F 3/00* | (2006.01) |
| *G06F 3/01* | (2006.01) |

(52) U.S. Cl.
CPC .................. *A63F 13/56* (2014.09); *A63F 13/00* (2013.01); *A63F 13/20* (2014.09); *A63F 13/28* (2014.09); *A63F 13/52* (2014.09); *G06F 1/1694* (2013.01); *G06F 3/005* (2013.01); *G06F 3/017* (2013.01)

(58) Field of Classification Search
USPC ......... 463/20, 25, 30, 32, 36, 37, 39; 345/158
See application file for complete search history.

(56) References Cited

U.S. PATENT DOCUMENTS

| | | | |
|---|---|---|---|
| 8,303,411 B2 | 11/2012 | Marks et al. | |
| 8,351,651 B2 | 1/2013 | Lee | |
| 2008/0119272 A1* | 5/2008 | Zalewski | ........................ 463/37 |
| 2011/0085705 A1 | 4/2011 | Izadi et al. | |
| 2012/0128201 A1 | 5/2012 | Brickhill | |
| 2012/0309532 A1 | 12/2012 | Ambrus et al. | |
| 2012/0327125 A1 | 12/2012 | Kutliroff et al. | |
| 2013/0010071 A1 | 1/2013 | Valik et al. | |
| 2013/0069931 A1 | 3/2013 | Wilson et al. | |

OTHER PUBLICATIONS

"International Search Report & Written Opinion for PCT Application Number: PCT/US2014/040971", Mailed Date: Aug. 14, 2014, 9 Pages.

Nirjon, et al., "Kinsight: Localizing and Tracking Household Objects using Depth-Camera Sensors", Retrieved at <<http://www.cs.virginia.edu/~stankovic/psfiles/DCOSS2012.pdf>>, In IEEE 8th International Conference on Distributed Computing in Sensor Systems, May 16, 2012, p. 8.

* cited by examiner

*Primary Examiner* — Adetokunbo O Torimiro
(74) *Attorney, Agent, or Firm* — Bryan Webster; Aaron Chatterjee; Micky Manhas (57) ABSTRACT

Example apparatus and methods concern an improved immersive experience for a video gamer that is provided by controlling a game based on the three dimensional location and orientation of a control and display device held by or otherwise associated with the gamer. The location is determined from data comprising a three dimensional position and an orientation of a portion of a player in a three dimensional space associated with a computerized game. The facing and rotation of the device is determined as a function of both the location of the device and the orientation of the device. The orientation may be determined by data from motion sensors in or on the device. Example apparatus and methods control the computerized game based, at least in part, on the position of the device, the facing of the device, and the rotation of the device.

16 Claims, 9 Drawing Sheets

LOCATING AND ORIENTING DEVICE IN SPACE

BACKGROUND

Gamers desire constantly improved and ever-more lifelike gaming experiences. Immersive experiences that put the player "in" the scene facilitate suspending reality and improving the game experience. Similarly, media consumers desire an ever more realistic or satisfying immersive experience. Conventionally, virtual reality or augmented reality may have required a player to stand in a particular location centered amongst extensive equipment and sophisticated multi-dimensional sensors to achieve a rudimentary immersive experience.

Conventionally, a user may have used a controller (e.g., keypad) to interact with a system. The user may be, for example, a gamer playing a video game on a game system, a media consumer having an immersive experience on a media system, or other user. The controller may have represented, for example, a steering wheel for a car, a stick for an airplane, or other implement associated with a game. Part of the immersive experience depends, at least in part, on establishing or maintaining a relationship between the player and the scene. The relationship may include or depend on the controller. For example, when the controller represents a steering wheel, the gamer's immersive experience may depend on the scenery looking like it is tracking their movements with the controller. While traditional systems may have had some ability to track the position, movements, or accelerations of a gamer, it may have been difficult, if even possible at all, to establish or maintain a point of view that depended on the position or location of the controller.

Conventionally, an avatar may have been provided for a user. The avatar may be, for example, a multi-dimensional graphical or other representation of the user. The avatar may be an object that represents the user and that functions as the user's character or alter ego in, for example, a video game. The avatar may have been moved through a game space based on tracking the movements or accelerations of the gamer or based on tracking the movements or accelerations of a game device. For example, in simulations like a golf game, the avatar may have been displayed holding a golf club. How the simulated golf club was moved in the game and thus the flight of the golf ball in the game may have depended on either the movement of the player as detected by a player movement sensor or the accelerations or movements of a game controller (e.g., game provided golf club with accelerometer). Separate data points from the separate systems may have been used to determine a club path or acceleration and thus to determine the ball flight. Thus, the quality of the immersion in the game experience may have depended on either player movement or controller movement, but not both.

SUMMARY

This Summary is provided to introduce, in a simplified form, a selection of concepts that are further described below in the Detailed Description. This Summary is not intended to identify key features or essential features of the claimed subject matter, nor is it intended to be used to limit the scope of the claimed subject matter.

Example apparatus and methods acquire first data about a three dimensional position and orientation of a portion (e.g., joint) of a player in a three dimensional space associated with a computerized game. Example apparatus and methods determine, as a function of the first data, a position in the three dimensional game space of a device held by the player. The device may be, for example, a game controller configured to control the computerized game or to display information associated with the computerized game. Example apparatus and methods acquire second data from motion sensors or other apparatus that describe an orientation of the device in the three dimensional game space. Example apparatus and methods then determine a facing and rotation of the device as a function of the first data and the second data. A computerized game may then be controlled based, at least in part, on the position of the device, the facing of the device, and the rotation of the device, rather than just the position of the player or the movement or acceleration of the controller. Controlling the game may include, for example, providing an alternate view into a media simulation, changing the alternate view in simulation space as the user moves through real space, presenting items or scenery in the alternate view in the context of the real space via the media simulation, or other actions.

Example apparatus and methods may be configured to determine a three-dimensional position of a game controller held by a gamer in a three-dimensional game space. The game controller may be configured with a display (e.g., screen) to present information (e.g., scenery, avatar, view) associated with the video game. For example, the display may provide a first person perspective to a viewer. Example apparatus and methods may be configured to determine an orientation of the game controller based on data about the gamer and data about the device. The data about the gamer may be acquired by interrogating the game space while the data about the device may be acquired from the device itself. Example apparatus and methods may then control the computerized video game based on the three-dimensional position and the orientation.

BRIEF DESCRIPTION OF THE DRAWINGS

The accompanying drawings illustrate various example apparatus, methods, and other embodiments described herein. It will be appreciated that the illustrated element boundaries (e.g., boxes, groups of boxes, or other shapes) in the figures represent one example of the boundaries. In some examples, one element may be designed as multiple elements or multiple elements may be designed as one element. In some examples, an element shown as an internal component of another element may be implemented as an external component and vice versa. Furthermore, elements may not be drawn to scale.

DETAILED DESCRIPTION

An improved immersive gaming and media consumption experience can be provided when the three dimensional location of a device (e.g., tablet acting as controller and display) as well as the orientation (e.g., facing, rotation) of the device are known. Sensors (e.g., accelerometer, gyroscope) associated with a device can provide information about the orientation of the device. Interrogating the game space using apparatus that provide information about two or more joints facilitate tracking those joints. In one embodiment, an apparatus may produce a depth map from which a representation (e.g., partial skeleton) of a game player holding the gaming device can be built. The depth map facilitates providing location information for the user and for the device. Example apparatus and methods determine the position and orientation of the device in the three dimensional game space using both the representation of the gamer and the motion sensor data. Interrogating the game space may include, for example, sending signals (e.g., infrared (IR) waves, visible light waves, sound waves) into a game space and processing signals that return from the game space. Interrogating the game space may also include, for example, collecting signals (e.g., IR, visible light, sound) generated by items (e.g., gamer, device) in the game space.

Figure 1:
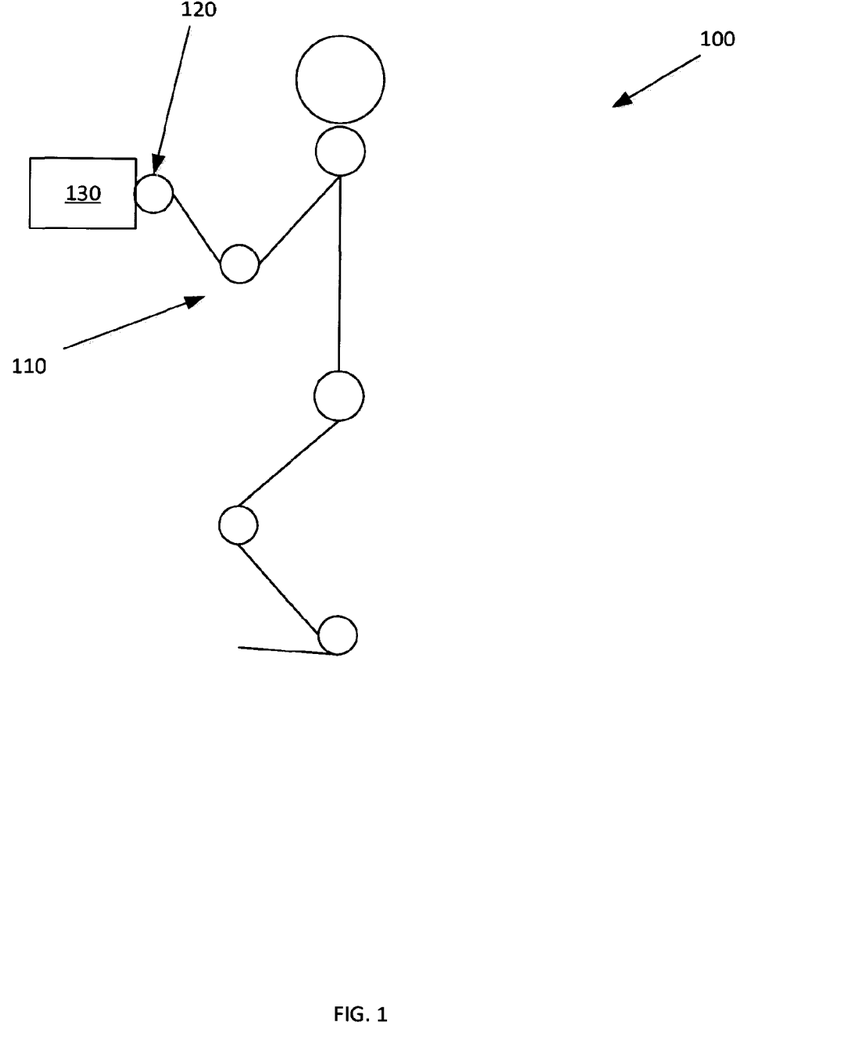
FIG. 1 illustrates an example representation of a skeleton of a gamer holding an example device.

FIG. 1 illustrates an example representation of a portion of a skeleton 100 of a gamer holding an example device 130. The skeleton 100 is illustrated having several joints, which are represented with circles. For example, skeleton 100 has an elbow joint 110 and a wrist joint 120. Which joints are visible may depend on which direction the gamer is facing with respect to a device(s) used to interrogate the game space. The skeleton 100 is a representation of a gamer in a three dimensional game space. The skeleton may be, for example, a partial skeleton or a full skeleton. Example apparatus and methods facilitate positioning or tracking handheld device 130 in the three dimensional game space.

Conventional gaming systems may track either the device 130 or the gamer. When a conventional system tracks only the device, a standard, un-customized (e.g., generic) avatar may be provided for the player. Displays of the movements of the standard avatar may be pre-programmed based on movements or accelerations detected from the device 130. When a conventional system tracks only the gamer, then the motion of the device may be inferred from the movements of the gamer without actually acquiring positioning or orientation data from the device. Displays of the movements or accelerations of the device may be pre-programmed based on the position of the gamer and an acceleration experienced by the device. Since some conventional systems may track either the gamer or the device, but not both, only a limited immersive experience may be achieved.

Figure 2:
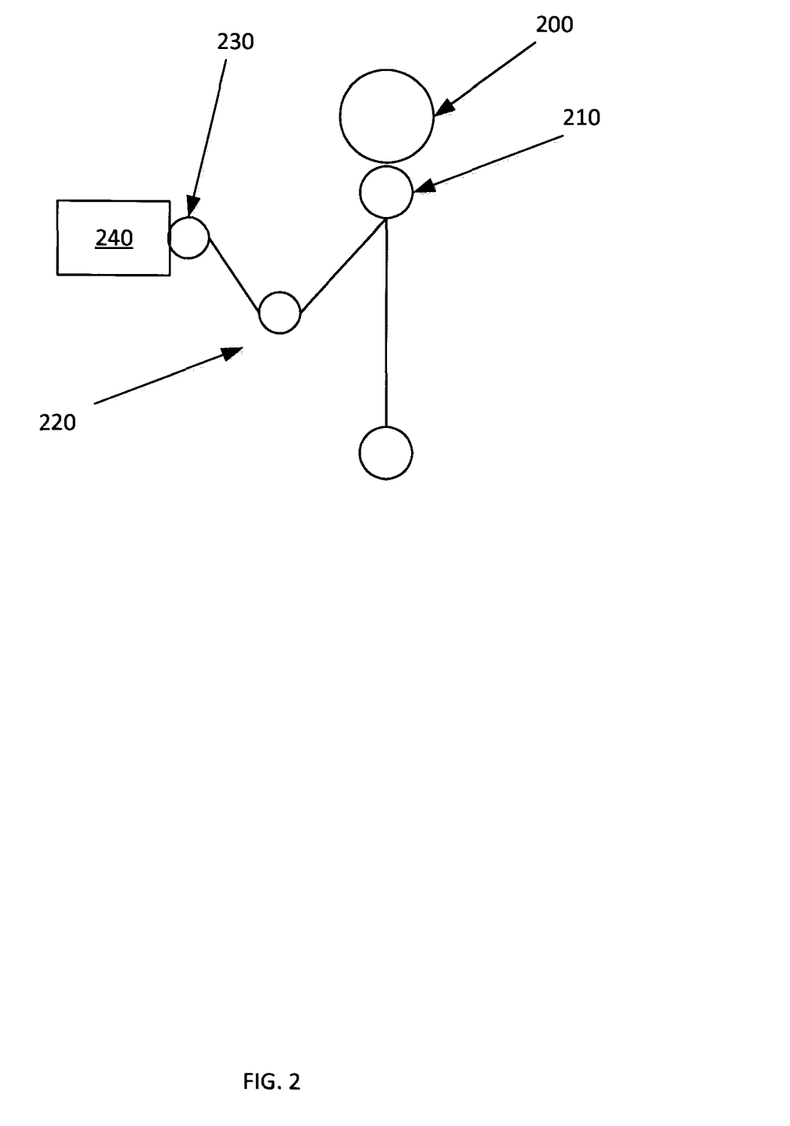
FIG. 2 illustrates a portion of an example representation of a skeleton of a gamer holding an example device.

FIG. 2 illustrates a portion of an example representation of a skeleton of a gamer holding an example device 240. The skeleton includes a head 200, a neck joint 210, an elbow joint 220 and a wrist joint 230. Example apparatus and methods may determine the absolute position of the device 240, which may be, for example, a tablet, a smartphone, a laptop, or other device that can be held by the gamer. Example apparatus and methods may determine the absolute position of the device 240 using information derived from the position and orientation of the joints as represented in the skeleton. Example apparatus and methods may then determine a likely orientation of the device 240 from the position and orientation of the joints as represented in the skeleton and from motion sensors located in device 240. The position and orientation that results from blending the two data sources facilitates producing an improved immersive experience.

Example apparatus and methods acquire data concerning a user's absolute position in space. Example apparatus and methods also acquire relative positional data or semi-relative positional data. The absolute position and the relative positional data may be combined using, for example, different types of filters to produce filtered and stabled data. In one embodiment, apparatus and methods may produce a depth map from data acquired by interrogating a game space. The data from which the depth map is produced may be stabilized and filtered to reduce noise. Once the depth map is created, example apparatus and methods may select which joints to include when calculating the position of the device 240. The selection may depend, at least in part, on which joints are visible and which joints are not visible. Example apparatus and methods may then process inputs from motion sensors (e.g., accelerometers, gyroscopes) on the device 240 to compute the orientation (e.g., facing, rotation) of the device 240. The motion sensor data may also be filtered to reduce noise. Since certain sensors may be complementary (e.g., accelerometer and gyroscope), the data from the motion sensors may be blended as a function of how quickly, if at all, the device 240 is moving or accelerating.

Example apparatus and methods may then combine data from the skeleton or depth map with the data from the motion sensor(s) to locate or track a precise position of the device 240. In one example, the combination may be weighted or filtered using, for example, a Kalman filter, to provide the estimate of the position and orientation of the device 240. Example apparatus and methods may produce a three dimensional (e.g., x,y,z) location of the device 240 in the game space. Example apparatus and methods may also produce a three dimensional vector that is perpendicular to the screen on device 240. This vector may be referred to as a facing vector. The facing vector indicates the direction in which the device 240 is facing. Example apparatus and methods may also identify a rotation about the facing vector.

Since the depth map and skeleton may report data in a first format and the motion sensors may report data in a second, different format, example apparatus and methods may transform input data from a raw native representation to a processed target representation that facilitates combining the two types of inputs. The input data may be filtered to address noise, fidelity, and confidence in the data at different times. Example apparatus and methods may then merge the data from various sources to produce a unified model of the system.

Figure 3:
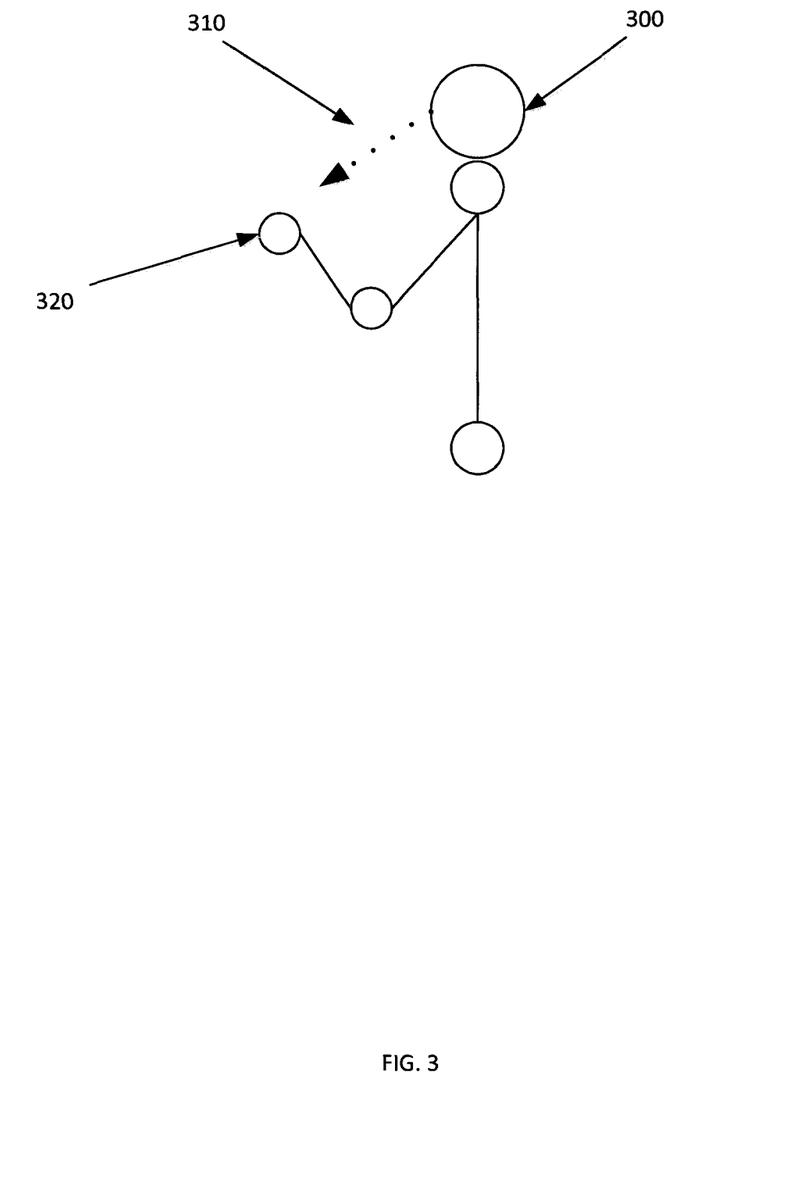
FIG. 3 illustrates a portion of an example representation of a skeleton of a gamer.

FIG. 3 illustrates a portion of an example representation of a skeleton of a gamer. The head 300 and one wrist 320 are illustrated. FIG. 3 also illustrates a gaze 310 from the head 300 to the wrist 320. A likely position of a hand may be determined from the position of the wrist 320. A likely position of a device may be determined from the position of the wrist 320, the position of the head 300, and the gaze 310. The gaze 310 may be captured, for example, by tracking the position and orientation of the face or of the eyes of the gamer. Example apparatus and methods may assume that the device is facing the user's face. Example apparatus and methods may also use heuristics to refine a baseline prediction by tracking the movement or accelerations of the hands and a normal associated with a joint(s).

Figure 4:
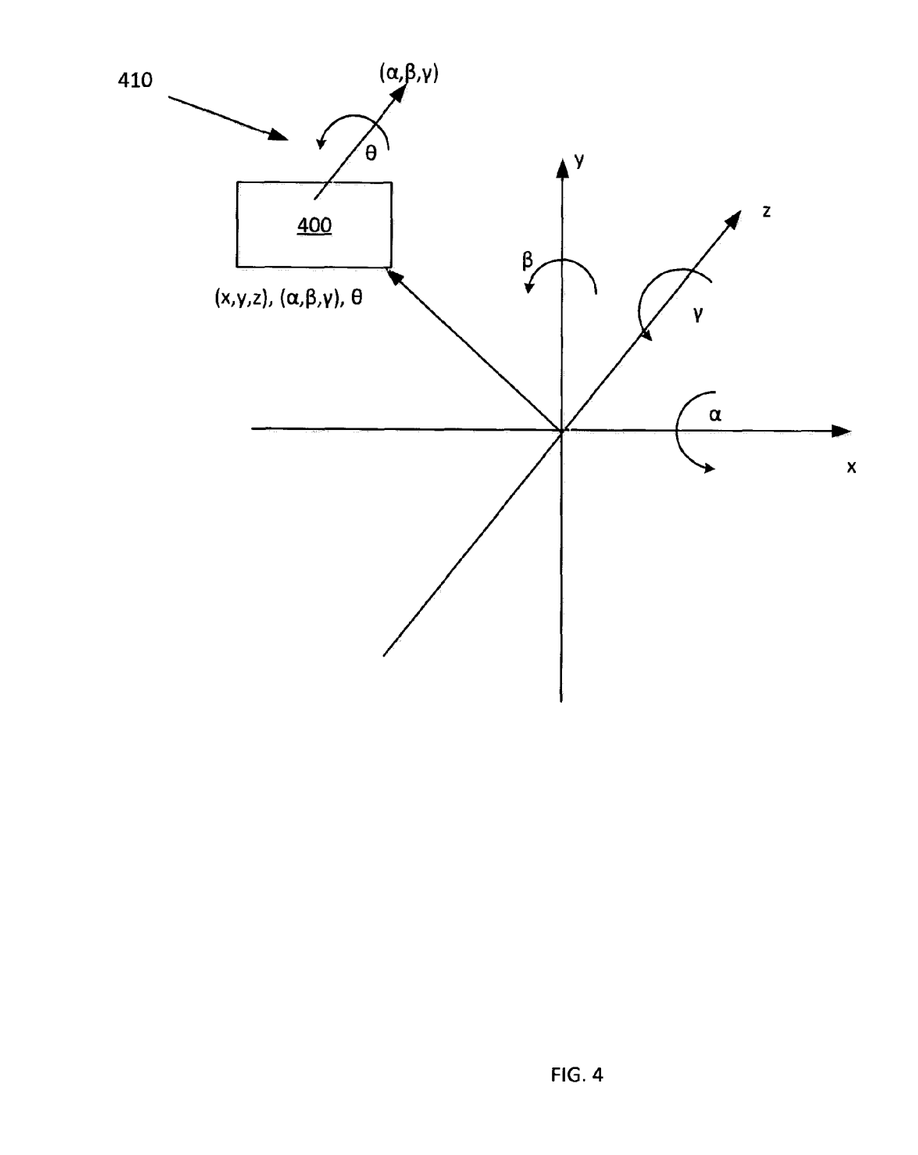
FIG. 4 illustrates an example frame of reference for a three dimensional game space.

FIG. 4 illustrates an example frame of reference for a three dimensional game space. It may be difficult, if even possible at all, to determine with any certainty the rotation of device 400 using just the skeleton data. One attempt may involve analyzing the orientation of the hands, wrists, elbows, and face of the gamer. The estimation of the orientation may be more accurate for larger devices (e.g., tablets) that are held in two hands but may be less accurate for smaller devices (e.g., smartphone) that are held in a single hand. While the three dimensional position may be accurately determined using the skeleton data, the orientation may be difficult to assess using skeleton data, or more generally using depth map or player position data. Thus, example apparatus and methods may also rely on motion sensors available in the held device. The devices may include accelerometers, gyroscopes, a compass, or other sensors.

Example apparatus and methods may determine the three dimensional (e.g., x,y,z) point representing the center of the hands of the gamer and proceed as though device 400 were centered at this (x,y,z) point in the 3d game space. Data from motion sensors may then be used to identify a 3d vector 410 that predicts the facing of device 400. The 3d vector 410 may be represented using an ($\alpha$, $\beta$, $\gamma$) representation where $\alpha$ represents a direction in the x axis, $\beta$ represents a direction in the y axis, and $\gamma$ represents a direction in the z axis. The device 400 may be facing along the 3d vector 410 but may also be rotated about the 3d vector 410. Thus, example apparatus and methods may use the motion sensor data to determine a rotation $\theta$ about the 3d vector 410. Identifying the position of device 400 using an (x,y,z) representation, the facing using an ($\alpha$, $\beta$, $\gamma$) representation (e.g., 3d vector 410), and a rotation $\theta$ about the 3d vector 410 may facilitate producing an improved immersive experience for the gamer.

Figure 9:
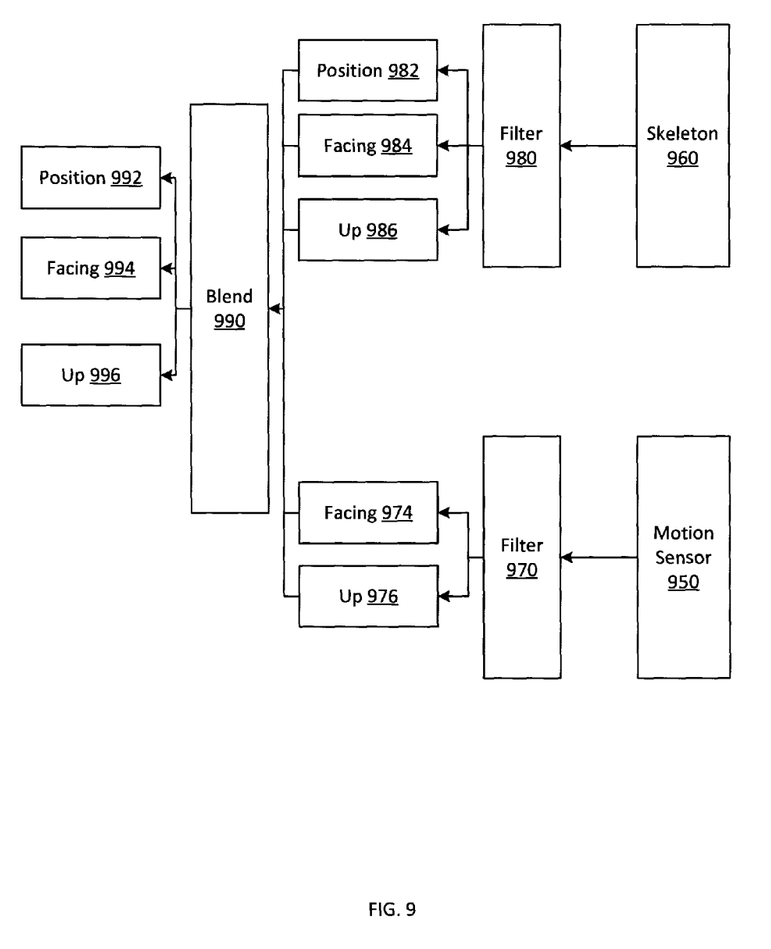
FIG. 9 illustrates the blending of signals from an interrogation of a game space and from motion sensors.

FIG. 9 illustrates the blending and filtering of skeleton data 960 and motion sensor data 950. The skeleton data 960 may pass through a filter 980 and yield position data 982, facing data 984, and up/down data 986. The motion sensor data 950 may pass through a filter 970 and yield facing data 974 and up/down data 976. The filtered data may then pass through a circuit or algorithm 990 that blends inputs to produce a position data 992 that is a function of position data 982 or other data. The circuit or algorithm 900 may also produce a facing data 994 that is a function of, for example, facing data 984 and facing data 974. Similarly, the blend circuit or algorithm 990 may produce an up/down data 996 that is a function of the up data 976 and the up data 986. Other arrangements of filters and combination elements may be employed.

Some portions of the detailed descriptions that follow are presented in terms of algorithms and symbolic representations of operations on data bits within a memory. These algorithmic descriptions and representations are used by those skilled in the art to convey the substance of their work to others. An algorithm is considered to be a sequence of operations that produce a result. The operations may include creating and manipulating physical quantities that may take the form of electronic values. Creating or manipulating a physical quantity in the form of an electronic value produces a concrete, tangible, useful, real-world result.

It has proven convenient at times, principally for reasons of common usage, to refer to these signals as bits, values, elements, symbols, characters, terms, numbers, and other terms. It should be borne in mind, however, that these and similar terms are to be associated with the appropriate physical quantities and are merely convenient labels applied to these quantities. Unless specifically stated otherwise, it is appreciated that throughout the description, terms including processing, computing, and determining, refer to actions and processes of a computer system, logic, processor, system-on-a-chip (SoC), or similar electronic device that manipulates and transforms data represented as physical quantities (e.g., electronic values).

Example methods may be better appreciated with reference to flow diagrams. For simplicity, the illustrated methodologies are shown and described as a series of blocks. However, the methodologies may not be limited by the order of the blocks because, in some embodiments, the blocks may occur in different orders than shown and described. Moreover, fewer than all the illustrated blocks may be required to implement an example methodology. Blocks may be combined or separated into multiple components. Furthermore, additional or alternative methodologies can employ additional, not illustrated blocks.

Figure 5:
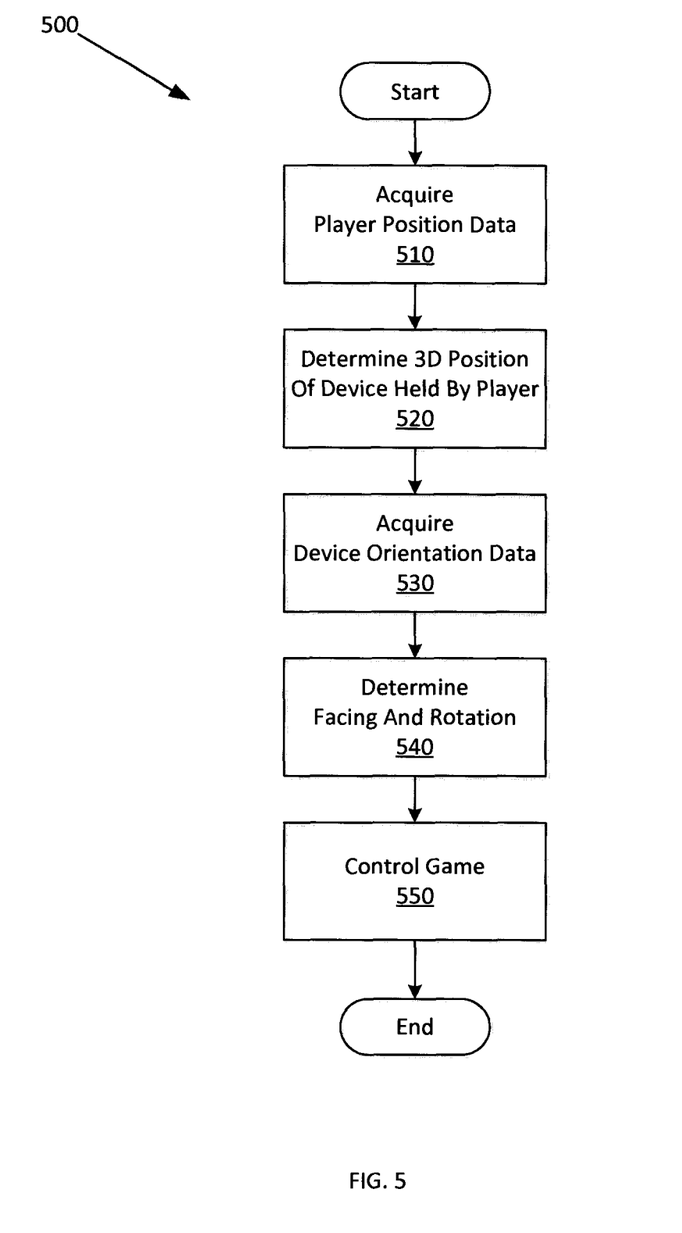
FIG. 5 illustrates an example method configured to facilitate locating and orienting a device in a game space.

FIG. 5 illustrates an example method 500 associated with locating and orienting a device in a game space. In different examples, method 500 may be performed on a single device, may be performed partially or completely in the cloud, may be performed on distributed co-operating devices, or may be performed other ways. In different examples, method 500 may be performed on devices including, but not limited to, a game console, a game controller, a computer, a laptop computer, a tablet computer, a phone, and a smart phone.

Method 500 may include, at 510, acquiring player position data. The player position data may include first data comprising a three dimensional position and an orientation of a portion of a player in a three dimensional space associated with a computerized game. In one embodiment, the first data may be acquired from a first system configured to produce a depth map of the player in the three dimensional space. The first data may be generated, for example, from an infrared interrogation of the game space. The first data may also be generated from, for example, a camera detecting visible light associated with the game space. While infrared interrogation and visible spectrum light collection are described, the first data may be collected in other ways. The first data may be used to construct a depth map of the space visible to the apparatus that collects the first data. For example, a depth map may be constructed for the area in the field of view visible to a game console.

The first data may be used to construct a representation of a skeleton of the player from data in the depth map. In one example, the skeleton may include a plurality of player joints. A single joint may be described by a location, a bend angle, an orientation, or other data. Sometimes a joint may not be visible to the apparatus collecting the first data. For example, a player may be turned in profile to the collector and thus information about the left arm may be visible but the right arm may not be visible. Thus, upon determining that the depth map is missing information concerning a joint that is relevant to determining the position of the device, method 500 may estimate the missing information based on a selected subset of the first data. For example, if the elbow joint is not visible, the location, bend angle, and orientation of the elbow may be estimated from information about the wrist joint and the shoulder joint.

Method 500 may also include, at 520, determining, as a function of the first data, a position in the three dimensional game space of a device held by the player. The device may be, for example, a game controller configured to control the computerized game or to display information associated with the computerized game. For example, the device may be a tablet computer configured to display a first person perspective of a game and to provide position and motion information about the player holding the tablet.

With the skeleton available, as described by the joints, the position of the device may be determined as a function of a relationship between two or more joints in the representation. For example, the device may be assumed to be held between the hands of a player. The location of the hands may be computed from the position of the wrist joints, the elbow joints, the shoulder joints, the head/neck joint, or other joints.

Method 500 may also include, at 530, acquiring second data comprising an orientation of the device in the three dimensional game space. In one embodiment, the second data may be acquired from the device. In one embodiment, the second data may be generated by a sensor in the device. In another embodiment, the second data may be generated by an apparatus on the device. In one embodiment, the second data may be generated by both a sensor in the device and an apparatus on the device. The sensor may be, for example, an accelerometer, a gyroscope, or a compass. The apparatus may be, for example, an infrared reflector (e.g., IR tape), an infrared transmitter, a sound reflector, a sound transmitter, a visible light reflector, a visible light transmitter, or other device from which orientation data may be determined.

In different embodiments the device may include one accelerometer or more than one accelerometer. Similarly, the device may include one gyroscope or more than one gyroscope. An accelerometer provides the direction of the gravity at the sensor and the strength of the gravity at the sensor. Accelerometers may be more accurate when the device housing the sensor is at rest, may be less accurate when the device housing the sensor is in motion, and may be even less accurate when there is a sudden acceleration of the device housing the sensor. Accelerometers may also be less accurate when the device is held at an angle where a rotation axis coincides with the vector indicating the direction of gravity. The strength of the gravity may be used to determine if the device is in motion, which can in turn be used to estimate the accuracy of the accelerometer readings.

A gyroscope provides angular velocity about three axes of rotation of a device. Gyroscopes complement accelerometers. For example, gyroscopes accurately describe sudden changes in orientation but may drift when the device is not subject to sudden accelerations (e.g., is at rest). Therefore, example apparatus and methods may be configured to weight readings from accelerometers and gyroscopes as a function of the instant observed acceleration of the device.

A compass may report the direction of magnetic north and true north. If a device has a compass and a GPS, the device may replace the degree of freedom that is lost from data reported by an accelerometer when the vector representing gravity lies along one of the device's axis of rotation. A camera may also be used to track the device's relative motion (e.g., velocity through space). In one embodiment, the camera may employ pattern recognition, feature tracking, or other approaches for tracking relative motion.

If the device has accelerometers but not gyroscopes, then filters (e.g., low pass filters) may be applied to data acquired from the accelerometers. When both accelerometers and gyroscopes are available, then data from both the accelerometers and gyroscopes can be combined because they provide complementary data. When multiple sensors or apparatus are available, different combinations of the data provided by the sensors or apparatus may be employed. These different combinations may involve filtering the data received in different ways. Additionally, the second data may be noisy and thus may be filtered.

Thus, method 500 may include filtering the first data to produce a filtered location data and filtering the second data to produce a filtered orientation data. After the filtering is performed, method 500 may compute the position of the device, the facing of the device, and the rotation of the device as a function of the filtered location data or the filtered orientation data. The filtering may include, for example, passing the first data or the second data through a Kalman filter, an extended Kalman filter, an unscented Kalman filter, another type of Kalman filter, a high pass filter, a low pass filter, a Bayesian network filter, or a particle filter. Once the filtering is complete, method 500 may combine information derived from the filtered location data with information derived from the orientation data according to a weighted blending function.

Method 500 may also include, at 540, determining a facing of the device and a rotation of the device as a function of the first data or the second data. In one embodiment, determining the facing may include computing, from the second data, a three dimensional facing vector that describes a facing axis perpendicular to a display on the device. The second data may also be processed to compute a rotation of the device about the facing axis.

In one embodiment, the position of the device, the facing of the device, or the rotation of the device may be determined as a function of a location and an orientation of a hand(s) of the player. For example, a user may hold a tablet in two hands but may hold a smart phone in one hand. In one example, the position of the device is inferred from the position of the hand(s) holding the device and the facing of the device is inferred from a relationship between the hand(s) holding the device and the player's face. In another example, the position of the device may be inferred from the position of the hand(s) holding the device and the facing or rotation may be inferred from the direction of a gaze of the player. The inferences or calculations used to determine the position or orientation of the device may dynamically vary in real time based, at least in part, on what information is available in the first data and on what information is available in the second data. For example, a first set of inferences and calculations may be employed when the player is facing the device used to acquire the first data and both hands, both elbows, both shoulders, and the face of the player are visible. However, a second set of inferences and calculations may be employed when the player has their back to the device used to acquire the first data. Additionally, different inferences and calculations may be employed when the device is in motion or when the device is in rest. For example, when the device is describing a long and powerful arc associated with swinging a golf club, one set of inferences and calculations may be employed. However, when the device is describing a small and finely controlled set of linear motions associated with navigating a rolling ball through a maze, a different set of inferences and calculations may be employed.

Method 500 may also include, at 550, controlling the computerized game based, at least in part, on the position of the device, the facing of the device, and the rotation of the device. In one embodiment, controlling the computerized game may include selectively altering a display of a game scene. The scene may be altered as a function of the position of the device, the facing of the device, the rotation of the device, or the acceleration of the device. For example, a first person perspective may change as the player changes the facing and orientation of the controller. In one embodiment, controlling the computerized game may include selectively altering a display of an avatar associated with the player. For example, the avatar may be repositioned as the player changes the position of the device, the facing of the device, or the rotation of the device.

While FIG. 5 illustrates various actions occurring in serial, it is to be appreciated that various actions illustrated in FIG. 5 could occur substantially in parallel. By way of illustration, a first process could substantially constantly acquire player position data and update the skeleton representation, a second process could determine the position of the device in the three dimensional space, a third process could substantially constantly acquire device orientation data and determine facing and rotation, and a fourth process could control the game. While four processes are described, it is to be appreciated that a greater or lesser number of processes could be employed and that lightweight processes, regular processes, threads, and other approaches could be employed.

In one example, a method may be implemented as computer executable instructions. Thus, in one example, a computer-readable storage medium may store computer executable instructions that if executed by a machine (e.g., computer) cause the machine to perform methods described or claimed herein including method 500. While executable instructions associated with the above methods are described as being stored on a computer-readable storage medium, it is to be appreciated that executable instructions associated with other example methods described or claimed herein may also be stored on a computer-readable storage medium. In different embodiments the example methods described herein may be triggered in different ways. In one embodiment, a method may be triggered manually by a user. In another example, a method may be triggered automatically.

"Computer-readable storage medium", as used herein, refers to a medium that stores instructions or data. "Computer-readable storage medium" does not refer to propagated signals, per se. A computer-readable storage medium may take forms, including, but not limited to, non-volatile media, and volatile media. Non-volatile media may include, for example, optical disks, magnetic disks, tapes, flash memory, ROM, and other media. Volatile media may include, for example, semiconductor memories, dynamic memory (e.g., dynamic random access memory (DRAM), synchronous dynamic random access memory (SDRAM), double data rate synchronous dynamic random-access memory (DDR SDRAM), etc.), and other media. Common forms of a computer-readable storage medium may include, but are not limited to, a floppy disk, a flexible disk, a hard disk, a magnetic tape, other magnetic medium, an application specific integrated circuit (ASIC), a compact disk (CD), other optical medium, a random access memory (RAM), a read only memory (ROM), a memory chip or card, a memory stick, and other media from which a computer, a processor or other electronic device can read.

Figure 6:
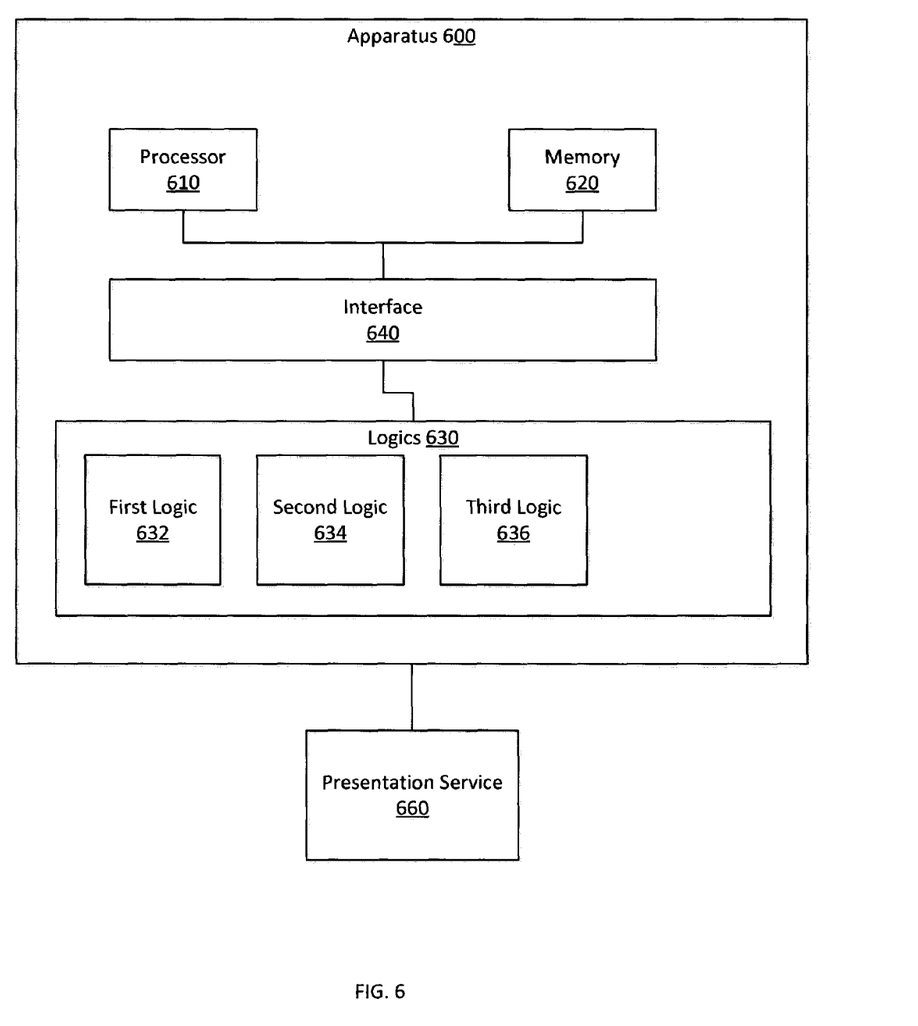
FIG. 6 illustrates an example apparatus configured to facilitate locating and orienting a device in a game space.

FIG. 6 illustrates an apparatus 600 that includes a processor 610, a memory 620, a set 630 of logics, and an interface 640 that connects the processor 610, the memory 620, and the set 630 of logics. The set 630 of logics may be configured to control a computerized interactive experience. The computerized interactive experience may be, for example, a video game, a media presentation, or other immersive experience. Apparatus 600 may be, for example, a computer, a laptop computer, a tablet computer, a personal electronic device, a smart phone, system-on-a-chip (SoC), a game console, a game controller, or other device that can access and process data.

In one embodiment, the apparatus 600 may be a general purpose computer that has been transformed into a special purpose computer for gaming through the inclusion of the set 630 of logics. The set 630 of logics may be configured to control a computerized interactive experience (e.g., video game). Apparatus 600 may interact with other apparatus, processes, and services through, for example, a computer network.

The set 630 of logics may include a first logic 632 that is configured to determine a three-dimensional position of a controller held by a user (e.g., gamer) in a three-dimensional space. The controller may be configured with a display to provide information associated with the interactive experience (e.g., video game). For example, the display may provide a first person perspective to the user, a third person perspective, a "thirty thousand feet" perspective, or other display.

In one embodiment, the first logic 632 may be configured to determine the three-dimensional position using a depth map. The depth map may include location and aspect (e.g., orientation, facing, bend angle) information concerning various joints of the gamer. For example, location and aspect information for joints including, but not limited to, a head/body joint, a neck joint, a shoulder joint, an elbow joint, a wrist joint, a finger joint, a body/pelvis joint, a hip joint, a knee joint, and a foot joint may be available. The depth map may be computed from information gathered about the user. The information may be gathered from detectable waves (e.g., infrared, visible light, sound) reflected from or produced by the user. While a depth map is described, more generally the first logic 632 may acquire information concerning a user's absolute position in a space.

The set 630 of logics may also include a second logic 634 that is configured to determine an orientation of the controller. In different embodiments, the second logic 634 may be configured to determine the orientation as a function of motion sensor data acquired from the controller, as a function of the depth map, as a function of the absolute position, or as a function of a combination of the motion sensor data and the absolute position. The second logic 634 may dynamically switch between how the orientation is determined based, for example, on the nature, type, quality, or timeliness of information available for determining the orientation. For example, at a first time, timely and precise depth map information may be available but motion sensor data may be incomplete or inaccurate. At this first time, the second logic 634 may rely more heavily on the depth map data. However, at a second time, the depth map may be less complete or less accurate because the gamer has turned their back to the console. However, the user may be performing a long dynamic motion with the controller. At this second time, the second logic 634 may rely more heavily on the motion sensor information.

In one embodiment, the second logic 634 may be configured to determine the three-dimensional position using first data from the absolute position data (e.g., depth map) and to determine the orientation using second data from the motion sensor data. To facilitate real-time computations that support a seamless immersive experience, the first data and the second data may be manipulated to share a standard system for representing the three-dimensional position and the orientation.

The set 630 of logics may also include a third logic 636 that is configured to control the computerized video game based on the three-dimensional position and the orientation. Controlling the game may include selectively altering a display attribute associated with a virtual reality aspect of the game, selectively altering a display attribute associated with an augmented reality aspect of the game, or selectively altering an x-ray attribute of an item in the game, among other actions. Controlling the game may also include selectively altering a scene displayed in the computerized interactive experience as a function of the position of the device and the orientation of the controller. Controlling the interactive experience may also include selectively altering an avatar associated with the user as a function of the position of the device and the orientation of the controller. Other control may also be exercised depending, for example, on a type of game being played and the perspective of a gamer.

In different embodiments, some processing may be performed on the apparatus 600 and some processing may be performed by an external service or apparatus. Thus, in one embodiment, apparatus 600 may also include a communication circuit that is configured to communicate with an external source to facilitate displaying game scenes, media, avatars, or other representations. In one embodiment, the third logic 636 may interact with a presentation service 660 to facilitate displaying data using different presentations for different devices.

Figure 7:
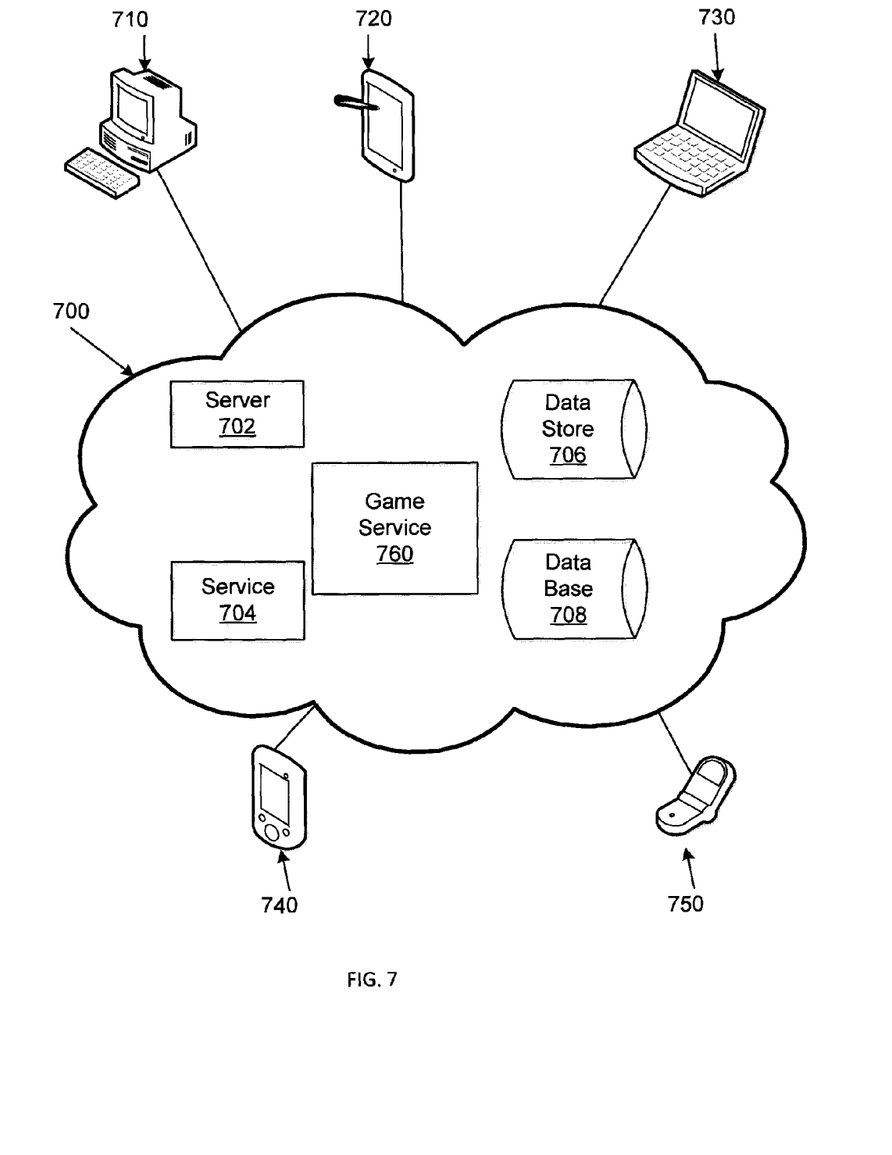
FIG. 7 illustrates an example cloud operating environment.

FIG. 7 illustrates an example cloud operating environment 700. A cloud operating environment 700 supports delivering computing, processing, storage, data management, applications, and other functionality as an abstract service rather than as a standalone product. Services may be provided by virtual servers that may be implemented as one or more processes on one or more computing devices. In some embodiments, processes may migrate between servers without disrupting the cloud service. In the cloud, shared resources (e.g., computing, storage) may be provided to computers including servers, clients, and mobile devices over a network. Different networks (e.g., Ethernet, Wi-Fi, 802.x, cellular) may be used to access cloud services. Users interacting with the cloud may not need to know the particulars (e.g., location, name, server, database) of a device that is actually providing the service (e.g., computing, storage). Users may access cloud services via, for example, a web browser, a thin client, a mobile application, or in other ways.

FIG. 7 illustrates an example game service 760 residing in the cloud. The game service 760 may rely on a server 702 or service 704 to perform processing and may rely on a data store 706 or database 708 to store data. While a single server 702, a single service 704, a single data store 706, and a single database 708 are illustrated, multiple instances of servers, services, data stores, and databases may reside in the cloud and may, therefore, be used by the game service 760.

FIG. 7 illustrates various devices accessing the game service 760 in the cloud. The devices include a computer 710, a tablet 720, a laptop computer 730, a personal digital assistant 740, and a mobile device (e.g., cellular phone, satellite phone, wearable computing device) 750, any of which may function as a game console, as a game controller, or as both a console and controller for a video game. The game service 760 may, for example, compute the position or orientation of a controller. The game service 760 may, for example, provide scenes for the game.

It is possible that different users at different locations using different devices may access the game service 760 through different networks or interfaces. In one example, the game service 760 may be accessed by a mobile device 750. In another example, portions of game service 760 may reside on a mobile device 750.

Figure 8:
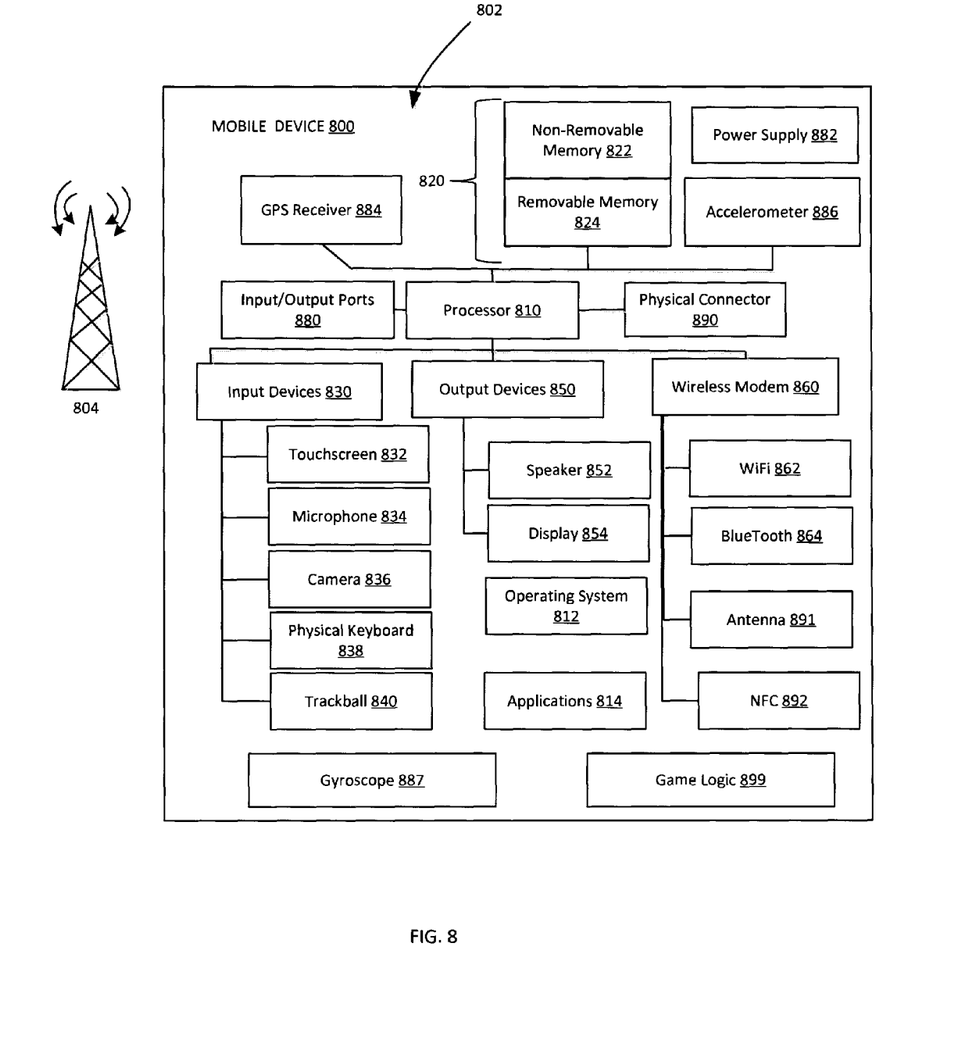
FIG. 8 is a system diagram depicting an exemplary mobile communication device configured to facilitate locating and orienting a device in a game space.

FIG. 8 is a system diagram depicting an exemplary mobile device 800 that includes a variety of optional hardware and software components, shown generally at 802. Components 802 in the mobile device 800 can communicate with other components, although not all connections are shown for ease of illustration. The mobile device 800 may be a variety of computing devices (e.g., cell phone, smartphone, handheld computer, Personal Digital Assistant (PDA), wearable computing device, etc.) and may allow wireless two-way communications with one or more mobile communications networks 804, such as a cellular or satellite networks. Mobile device 800 may function as a game console, as a game controller, or as both a console and controller.

Mobile device 800 can include a controller or processor 810 (e.g., signal processor, microprocessor, ASIC, or other control and processing logic circuitry) for performing tasks including signal coding, data processing, input/output processing, power control, or other functions. An operating system 812 can control the allocation and usage of the components 802 and support application programs 814. The application programs 814 can include gaming applications, mobile computing applications (e.g., email applications, calendars, contact managers, web browsers, messaging applications), or other computing applications.

Mobile device 800 can include memory 820. Memory 820 can include non-removable memory 822 or removable memory 824. The non-removable memory 822 can include random access memory (RAM), read only memory (ROM), flash memory, a hard disk, or other memory storage technologies. The removable memory 824 can include flash memory or a Subscriber Identity Module (SIM) card, which is well known in GSM communication systems, or other memory storage technologies, such as "smart cards." The memory 820 can be used for storing data or code for running the operating system 812 and the applications 814. Example data can include game images, avatars, game scenes, web pages, text, images, sound files, video data, or other data sets to be sent to or received from one or more network servers or other devices via one or more wired or wireless networks. The memory 820 can be used to store a subscriber identifier, such as an International Mobile Subscriber Identity (IMSI), and an equipment identifier, such as an International Mobile Equipment Identifier (IMEI). The identifiers can be transmitted to a network server to identify users or equipment.

The mobile device 800 can support one or more input devices 830 including, but not limited to, a touchscreen 832, a microphone 834, a camera 836, a physical keyboard 838, or trackball 840. The mobile device 800 may also support output devices 850 including, but not limited to, a speaker 852 and a display 854. Other possible output devices (not shown) can include piezoelectric or other haptic output devices. Some devices can serve more than one input/output function. For example, touchscreen 832 and display 854 can be combined in a single input/output device. The input devices 830 can include a Natural User Interface (NUI). An NUI is an interface technology that enables a user to interact with a device in a "natural" manner, free from artificial constraints imposed by input devices such as mice, keyboards, remote controls, and others. Examples of NUI methods include those relying on speech recognition, touch and stylus recognition, gesture recognition (both on screen and adjacent to the screen), air gestures, head and eye tracking, voice and speech, vision, touch, gestures, and machine intelligence. Other examples of a NUI include motion gesture detection using accelerometers/gyroscopes, facial recognition, three dimensional (3D) displays, head, eye, and gaze tracking, immersive augmented reality and virtual reality systems, all of which provide a more natural interface, as well as technologies for sensing brain activity using electric field sensing electrodes (EEG and related methods). Thus, in one specific example, the operating system 812 or applications 814 can comprise speech-recognition software as part of a voice user interface that allows a user to operate the device 800 via voice commands. Further, the device 800 can include input devices and software that allow for user interaction via a user's spatial gestures, such as detecting and interpreting gestures to provide input to a gaming application.

A wireless modem 860 can be coupled to an antenna 891. In some examples, radio frequency (RF) filters are used and the processor 810 need not select an antenna configuration for a selected frequency band. The wireless modem 860 can support two-way communications between the processor 810 and external devices. The modem 860 is shown generically and can include a cellular modem for communicating with the mobile communication network 804 and/or other radio-based modems (e.g., Bluetooth 864 or Wi-Fi 862). The wireless modem 860 may be configured for communication with one or more cellular networks, such as a Global system for mobile communications (GSM) network for data and voice communications within a single cellular network, between cellular networks, or between the mobile device and a public switched telephone network (PSTN). NFC 892 facilitates having near field communications.

The mobile device 800 may include at least one input/output port 880, a power supply 882, a satellite navigation system receiver 884, such as a Global Positioning System (GPS) receiver, an accelerometer 886, a gyroscope 887, or a physical connector 890, which can be a Universal Serial Bus (USB) port, IEEE 1394 (FireWire) port, RS-232 port, or other port. The illustrated components 802 are not required or all-inclusive, as other components can be deleted or added.

Mobile device 800 may include a game logic 899 that is configured to provide a functionality for the mobile device 800. For example, game logic 899 may provide a client for interacting with a service (e.g., service 760, FIG. 7). Portions of the example methods described herein may be performed by game logic 899. Similarly, game logic 899 may implement portions of apparatus described herein.

The following includes definitions of selected terms employed herein. The definitions include various examples or forms of components that fall within the scope of a term and that may be used for implementation. The examples are not intended to be limiting. Both singular and plural forms of terms may be within the definitions.

References to "one embodiment", "an embodiment", "one example", and "an example" indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Data store", as used herein, refers to a physical or logical entity that can store data. A data store may be, for example, a database, a table, a file, a list, a queue, a heap, a memory, a register, and other physical repository. In different examples, a data store may reside in one logical or physical entity or may be distributed between two or more logical or physical entities.

"Logic", as used herein, includes but is not limited to hardware, firmware, software in execution on a machine, or combinations of each to perform a function(s) or an action(s), or to cause a function or action from another logic, method, or system. Logic may include a software controlled microprocessor, a discrete logic (e.g., ASIC), an analog circuit, a digital circuit, a programmed logic device, a memory device containing instructions, and other physical devices. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the Applicant intends to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-readable storage device storing computer-executable instructions that when executed by a computer control the computer to perform a method for locating and orienting a device in space, the method comprising:
   acquiring first electronic data comprising a three dimensional position and an orientation of a portion of a user in a three dimensional space associated with a computerized interactive experience, where the first data is acquired from a first system configured to produce a depth map of the user in the three dimensional space, or where the first data is generated from an infrared interrogation of the three dimensional space or where the first data is generated from a camera detecting visible light associated with the three dimensional space;
   determining, as a function of the first data, a position in the three dimensional space of a device held by the user, the device being a controller configured to control the computerized interactive experience or to display information associated with the computerized interactive experience;
   acquiring second electronic data comprising an orientation of the device in the three dimensional space, where the second data is generated by a sensor in the device or where the second data is generated by an apparatus on the device, where the sensor is an accelerometer, a gyroscope, or a compass, and where the apparatus is an infrared reflector, an infrared transmitter, a sound reflector, a sound transmitter, a visible light reflector, or a visible light transmitter;
   determining a facing of the device and a rotation of the device as a function of the first data or the second data, and
   controlling the computerized interactive experience based, at least in part, on the position of the device, the facing of the device, and the rotation of the device.

2. The computer-readable storage device of claim 1, comprising:
   constructing a representation of a skeleton of the user from the depth map, where the skeleton comprises a plurality of joints of the user, where a joint is described by a location, a bend angle, and an orientation, and
   determining the position of the device as a function of a relationship between two or more joints in the representation.

3. The computer-readable storage device of claim 1, comprising:
   upon determining that the depth map is missing information concerning a joint that is relevant to determining the position of the device, estimating the missing information based on a selected subset of the first data.

4. The computer-readable storage device of claim 1, comprising:
   acquiring the second data from the device,
   computing, from the second data, a three dimensional facing vector that describes a facing axis perpendicular to a display on the device, and
   computing, from the second data, a rotation of the device about the facing axis.

5. The computer-readable storage device of claim 1, comprising:
    filtering the first data to produce a filtered and stable location data;
    filtering the second data to produce a filtered and stable orientation data; and
    computing the position of the device, the facing of the device, and the rotation of the device as a function of the filtered location data or the filtered orientation data,
    where filtering the first data to produce the filtered location data includes passing the first data through a Kalman filter, an extended Kalman filter, an unscented Kalman Filter, a high pass filter, a low pass filter, a Bayesian network filter, or a particle filter, and
    where filtering the second data to produce the filtered orientation data includes passing the second data through a Kalman filter, a high pass filter, a low pass filter, a Bayesian network filter, or a particle filter.

6. The computer-readable storage device of claim 5, comprising:
    combining information derived from the filtered and stable location data with information derived from the filtered and stable orientation data according to a weighted blending function, where the weights for the weighted blending function are based, at least in part, on a completeness of the first data, a completeness of the second data, an accuracy of the first data, an accuracy of the second data, a timeliness of the first data, or a timeliness of the second data.

7. The computer-readable storage device of claim 1, comprising:
    dynamically reconfiguring a function for determining the position based, at least in part, on a completeness of the first data, an accuracy of the first data, or a timeliness of the first data, and
    dynamically reconfiguring a function for determining a facing of the device and a rotation of the device based, at least in part, on a completeness of the first data, a completeness of the second data, an accuracy of the first data, an accuracy of the second data, a timeliness of the first data, or a timeliness of the second data.

8. The computer-readable storage device of claim 1, comprising:
    determining the position of the device, the facing of the device, or the rotation of the device as a function of a location and an orientation of a hand of the player, or
    determining the position of the device, the facing of the device, or the rotation of the device as a function of a location and an orientation of the head of the player or as a function of a direction of a gaze of the player.

9. The computer-readable storage device of claim 1, where the computerized interactive experience is a computerized game or a digital media with which the user interacts.

10. The computer-readable storage device of claim 1, where controlling the computerized interactive experience includes selectively altering a display of a game scene, selectively altering a display of an avatar associated with the user, providing an alternate view into a media simulation, changing the alternative view in a simulation space as the user moves through real space, or presenting an item in the alternative view in the context of a real space via the media simulation.

11. A computer-readable storage device storing computer-executable instructions that when executed by a computer control the computer to perform a method, the method comprising:
    acquiring, from a first system configured to produce a depth map of a player in a three dimensional space associated with a computerized game, first data comprising a three dimensional position and an orientation of a portion of the player in the three dimensional space;
    constructing a representation of a skeleton of the player from the depth map, where the representation of the skeleton is a function of locations, bends, and orientations of a plurality of joints of the player;
    determining, as a function of a relationship between two or more joints in the representation of the skeleton, a position in the three dimensional game space of a control and display device held by the player;
    acquiring, from a sensor in the control and display device or from an apparatus on the control and display device, second data comprising an orientation of the control and display device in the three dimensional game space, the sensor being an accelerometer, a gyroscope, or a compass, the apparatus being an infrared reflector, an infrared transmitter, a sound reflector, a sound transmitter, a visible light reflector, or a visible light transmitter; determining, from the representation of the skeleton or from the second data, a facing of the control and display device and a rotation of the control and display device as a function of the first data or the second data, where the facing is described by a three dimensional facing vector that describes a facing axis perpendicular to a display on the control and display device;
    determining, from the representation of the skeleton or from the second data, a rotation of the control and display device about the facing axis;
    dynamically reconfiguring a function for determining the position based, at least in part, on a completeness of the first data, an accuracy of the first data, or a timeliness of the first data;
    dynamically reconfiguring a function for determining a facing of the device and a rotation of the device based, at least in part, on a completeness of the first data, a completeness of the second data, an accuracy of the first data, an accuracy of the second data, a timeliness of the first data, or a timeliness of the second data, and
    controlling the computerized game based, at least in part, on the position of the control and display device, the facing of the control and display device, and the rotation of the control and display device, where controlling the computerized game comprises selectively altering a game scene display as a function of the position of the control and display device, the facing of the control and display device, or the rotation of the control and display device, selectively altering a display of an avatar associated with the player as a function of the position of the control and display device, the facing of the control and display device, or the rotation of the control and display device, providing an alternate view into a media simulation, changing the alternative view in a simulation space as the player moves through real space, or presenting an item in the alternative view in the context of a real space via the media simulation.

12. An apparatus, comprising:
    a processor;
    a memory;
    a set of logics configured to control a computerized interactive experience; and
    an interface to connect the processor, the memory, and the set of logics;
    the set of logics comprising:
        a first logic that determines a three-dimensional position of a controller held by a user in a three-dimensional space associated with the computerized interactive experience using a depth map, where the depth map comprises location and aspect information concerning a head/body joint of the user, a shoulder joint of the user, an elbow joint of the user, a wrist joint of the user, a finger joint of the user, a body/pelvis joint of the user, a hip joint of the user, a knee joint of the user, or a foot joint of the user, the controller being configured with a display to display information associated with the computerized interactive experience;

a second logic that determines an orientation of the controller; and a third logic that controls the computerized interactive experience based on the three-dimensional position and the orientation.

13. The apparatus of claim 12, where the second logic determines the orientation as a function of motion sensor data acquired from the controller, as a function of the depth map, or as a function of a combination of the motion sensor data and the depth map.

14. The apparatus of claim 13, where the second logic determines the three-dimensional position using first data from the depth map and determines the orientation using second data from the motion sensor data, where the first data and the second data share a standard system for representing the three-dimensional position and the orientation.

15. The apparatus of claim 14, where the first logic and the second logic dynamically reconfigure how to determine the three-dimensional position of a controller and to dynamically reconfigure how to determine the orientation of the controller based on the quality, accuracy, or completeness of the depth map or the motion sensor data.

16. The apparatus of claim 14, where the third logic controls the computerized interactive experience to selectively alter a scene displayed in the computerized interactive experience as a function of the position of the device and the orientation of the controller, to selectively alter an avatar associated with the user as a function of the position of the device and the orientation of the controller, to selectively alter a display attribute associated with a virtual reality aspect of the computerized interactive experience, to selectively alter a display attribute associated with an augmented reality aspect of the computerized interactive experience, to selectively alter an x-ray attribute of an item in the computerized interactive experience, to provide an alternate view into a media simulation, to change the alternative view in a simulation space as the user moves through real space, or to present an item in the alternative view in the context of a real space via the media simulation.

* * * * *